US011219160B2

(12) United States Patent
Takaoka

(10) Patent No.: US 11,219,160 B2
(45) Date of Patent: Jan. 11, 2022

(54) RIDING MOWER WITH A CUTTING GUIDE

(71) Applicant: KUBOTA CORPORATION, Osaka (JP)

(72) Inventor: Masaki Takaoka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 383 days.

(21) Appl. No.: 16/223,666

(22) Filed: Dec. 18, 2018

(65) Prior Publication Data

US 2020/0187417 A1      Jun. 18, 2020

(51) Int. Cl.
*A01D 34/82*       (2006.01)
*A01D 34/00*       (2006.01)
*A01D 34/64*       (2006.01)
*A01D 101/00*      (2006.01)

(52) U.S. Cl.
CPC ........... *A01D 34/82* (2013.01); *A01D 34/001* (2013.01); *A01D 34/006* (2013.01); *A01D 34/64* (2013.01); *A01D 2101/00* (2013.01)

(58) Field of Classification Search
CPC ...... A01D 34/81; A01D 34/82; A01D 34/006; A01D 34/001; A01D 34/00; A01D 34/64; A01D 2101/00; A01D 43/16; G05D 2201/0208
See application file for complete search history.

(56) References Cited

U.S. PATENT DOCUMENTS

| | | | | |
|---|---|---|---|---|
| 3,024,586 | A * | 3/1962 | Curran | A01D 34/82 56/320.1 |
| 3,425,197 | A * | 2/1969 | Kita | A01D 34/008 56/10.2 F |
| 4,545,453 | A * | 10/1985 | Yoshimura | A01B 69/008 180/401 |
| 4,573,547 | A * | 3/1986 | Yoshimura | A01B 69/008 180/168 |
| 4,603,753 | A * | 8/1986 | Yoshimura | G05D 1/0259 180/168 |
| 4,868,752 | A * | 9/1989 | Fujii | G05D 1/0246 701/28 |
| 5,355,664 | A * | 10/1994 | Zenner | A01D 34/82 16/35 D |
| 5,528,888 | A * | 6/1996 | Miyamoto | A01B 69/008 56/10.2 F |
| 6,397,569 | B1 * | 6/2002 | Homburg | A01D 41/1278 56/10.2 F |
| 6,556,598 | B1 * | 4/2003 | Angott | A01D 34/008 372/9 |

(Continued)

FOREIGN PATENT DOCUMENTS

DE      2552530 A1 *  5/1977 ............. A01D 34/82
EP      1917847 A1 *  5/2008 ............. A01D 34/82

*Primary Examiner* — Adam J Behrens
(74) *Attorney, Agent, or Firm* — Greenblum & Bernstein, P.L.C.

(57) ABSTRACT

A riding mower includes front wheels and rear wheels that support a vehicle body frame on the ground surface, a driver's seat disposed upwardly of the vehicle body frame, a mower deck disposed downwardly of the vehicle body frame and a cutting guide device configured to create an overlap mark that hints a cutting overlap line at a position forwardly of the front wheels and the mower deck and closer to the ground surface than the vehicle body frame.

7 Claims, 5 Drawing Sheets

(56) References Cited

U.S. PATENT DOCUMENTS

| | | | | |
|---|---|---|---|---|
| 8,046,980 B1* | 11/2011 | Schroeck | ............... | A01D 43/16 56/12.7 |
| 9,357,695 B2* | 6/2016 | Higashikawa | ....... | A01D 34/001 |
| 10,538,179 B2* | 1/2020 | Asahara | ................. | B60K 15/03 |
| 2007/0028459 A1* | 2/2007 | Thomson | ........... | A01D 34/4168 30/276 |
| 2010/0154374 A1* | 6/2010 | Hibino | ................... | A01D 34/62 56/249 |
| 2015/0296718 A1* | 10/2015 | Houseman | ............. | A01D 43/00 56/17.5 |
| 2015/0359168 A1* | 12/2015 | Higashikawa | ......... | A01D 34/82 56/14.7 |
| 2017/0166044 A1 | 6/2017 | Asahara et al. | | |
| 2017/0322559 A1* | 11/2017 | Fukuda | ................ | G05D 1/0088 |
| 2018/0077861 A1* | 3/2018 | Lego | .................. | A01D 34/4165 |
| 2018/0160619 A1* | 6/2018 | Manji | ................ | A01D 34/6818 |

\* cited by examiner

RIDING MOWER WITH A CUTTING GUIDE

TECHNICAL FIELD

This invention relates to a riding mower including a driver's seat disposed upwardly of a vehicle body frame supported on the ground surface by front wheels and rear wheels and a mower deck disposed downwardly of the vehicle body frame.

BACKGROUND ART

A riding mower effects, while traveling, a grass cutting operation by rotating a blade disposed inside a mower deck. In an operation of cutting grass (lawn) in a golf course or a ballpark, a straight traveling route or a traveling route having a large curvature radius is often employed. In this, when a grass cutting operation is to be made in a uncut area adjacent a cut area, a cutting overlap is implemented on the side of the cut area in order to avoid cutting leftover. If the cutting overlap is too large, this results in disadvantageous reduction the substantial working width, thus, deterioration in the work efficiency. On the other hand, if the cutting overlap is too small, the cutting leftover tends to occur. Also, in the event of deviation in traveling of the vehicle body, no cutting leftover will occur as long as the traveling deviation relative to a target straight traveling line is confined within the cutting overlap, but a problem occurs in the aesthetic quality of cutting trace or mark. For this reason, it is required for the driver to maneuver with as small as possible deviation from the target straight traveling line.

As a solution for assisting a driver for accurate maneuvering, according to a mower disclosed in U.S. Patent Application Publication No. 2017/0166044, a first corner pole and a second corner pole are mounted vertically from brackets provided at a left end and a right end of a front wheel supporting frame. The first corner pole serves as a mark for a driver seated at the driver's seat to view the outer end of the mower deck in the vehicle body transverse direction. The second corner pole serves as a mark for the driver seated at the driver's seat to view the outer end of a rotary blade rotational path (grass cutting boundary position). More particularly, the first corner pole is distant from a vehicle body centerline extending in a vehicle body front/rear direction by a distance equal to the distance from this vehicle body centerline to an outer end position of the mower deck and is used for driver's estimating a path of the mower deck outer end position. Whereas, the second corner pole is distant from the vehicle body centerline by a distance equal to the distance from the vehicle body centerline extending in the vehicle body front/rear direction to an outermost end in the horizontal direction of the rotational path of the blade and is used for driver's estimating a path of grass cutting borderline by the blade.

In the mower disclosed in this U.S. Patent Application Publication No. 2017/0166044, since the second corner pole not only extends upwards from the vehicle body frame, but is located rearwardly of the front wheels, certain skill and experience are required for estimating the path of grass cutting borderline by the blade on a grass surface where a grass cutting work is to be carried out.

SUMMARY OF THE INVENTION

In view of the above-described state of the art, an object of this invention is to provide a mower capable of suppressing occurrence of cutting leftover even with a small overlap and yet capable of realizing improvement in the straight traveling performance.

A mower according to the present invention comprises:
a vehicle body frame;
front wheels and rear wheels that support the vehicle body frame on a ground surface;
a driver's seat disposed upwardly of the vehicle body frame;
a mower deck disposed downwardly of the vehicle body frame;
a blade unit disposed inside the mower deck; and
a cutting guide device configured to create an overlap mark that hints a cutting overlap line at a position forwardly of the front wheels and the mower deck and closer to the ground surface than the vehicle body frame.

With the above-described arrangement, a cutting overlap line as a virtual line for indicating a cutting overlap is located downwardly of the overlap mark created by the invention. As this overlap mark is closer to the ground surface, thus being closer to the grass surface, than the vehicle body frame, the driver, with using this overlap mark as a target or "criterion", can estimate the cutting overlap line easily and accurately. Moreover, in case the mower deck is disposed forwardly of the front wheels (i.e. the case of a front mower), the overlap mark is located forwardly of the front wheels, so the possibility of the driver's view viewing the overlap mark being blocked by some component of the mower is low. Further, in case the mower deck is disposed between the front wheels and the rear wheels (i.e. the case of a mid-mount mower), as the overlap mark is located forwardly of the front wheels, the possibility of the driver's view viewing the overlap mark being blocked by some component of the mower is low in this case also.

The cutting guide device employed in the invention can be a mechanical guide assembly, an optical guide assembly, a fluid spray guide assembly, etc. Preferably, the mechanical guide assembly can employ a universal arm mechanism capable of maintaining a maker body used as the overlap mark at an appropriate position. Further, such marker body comprises a light emitting body advantageously. This is advantageous since such marker body can be readily viewed by the driver even in a bad weather such as cloudy, misty, rainy weather.

With an optical guide assembly, the overlap mark can be projected optically in the form of a dot or a line on the grass-grown surface with using a laser beam. Especially, with creation of a line-like overlap mark, the laser beam projected on the grass surface as it is can show the overlap line. So, maneuvering with accurately keeping the overlap is made easy. Further, for such line-like overlap mark, with use of a laser scanning technique or a diffraction grating, an overlap mark can be easily created with a desired length and at a desired position from the vehicle body of the mower.

In the case of the fluid spray guide assembly, with a fluid discharged from a nozzle, a dot-like or line-like overlap mark can be created on the grass surface. In this case too, if the nozzle is provided with a scanning function, it becomes possible to create an overlap mark having a desired length. Such fluid to be used can be water advantageously. In this case, for better visibility for the driver, colored water may be employed.

DETAILED DESCRIPTION

Next, a mower according to the invention will be explained with reference to the accompanying drawings. In the following detailed description, unless indicated explicitly otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Figure 1:
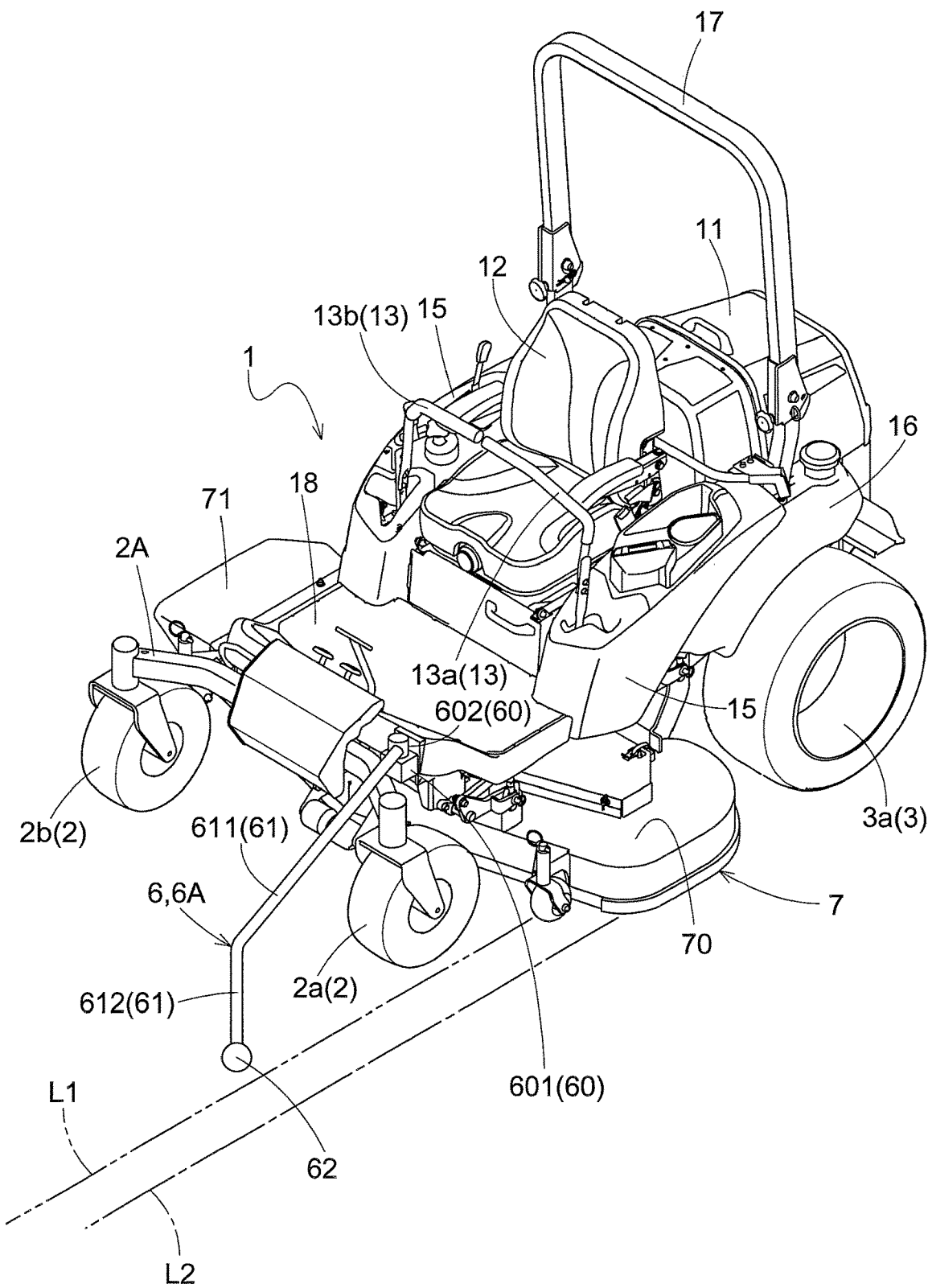
FIG. 1 is a perspective view of a mower using a mechanical guide assembly as a cutting guide device.
Figure 2:
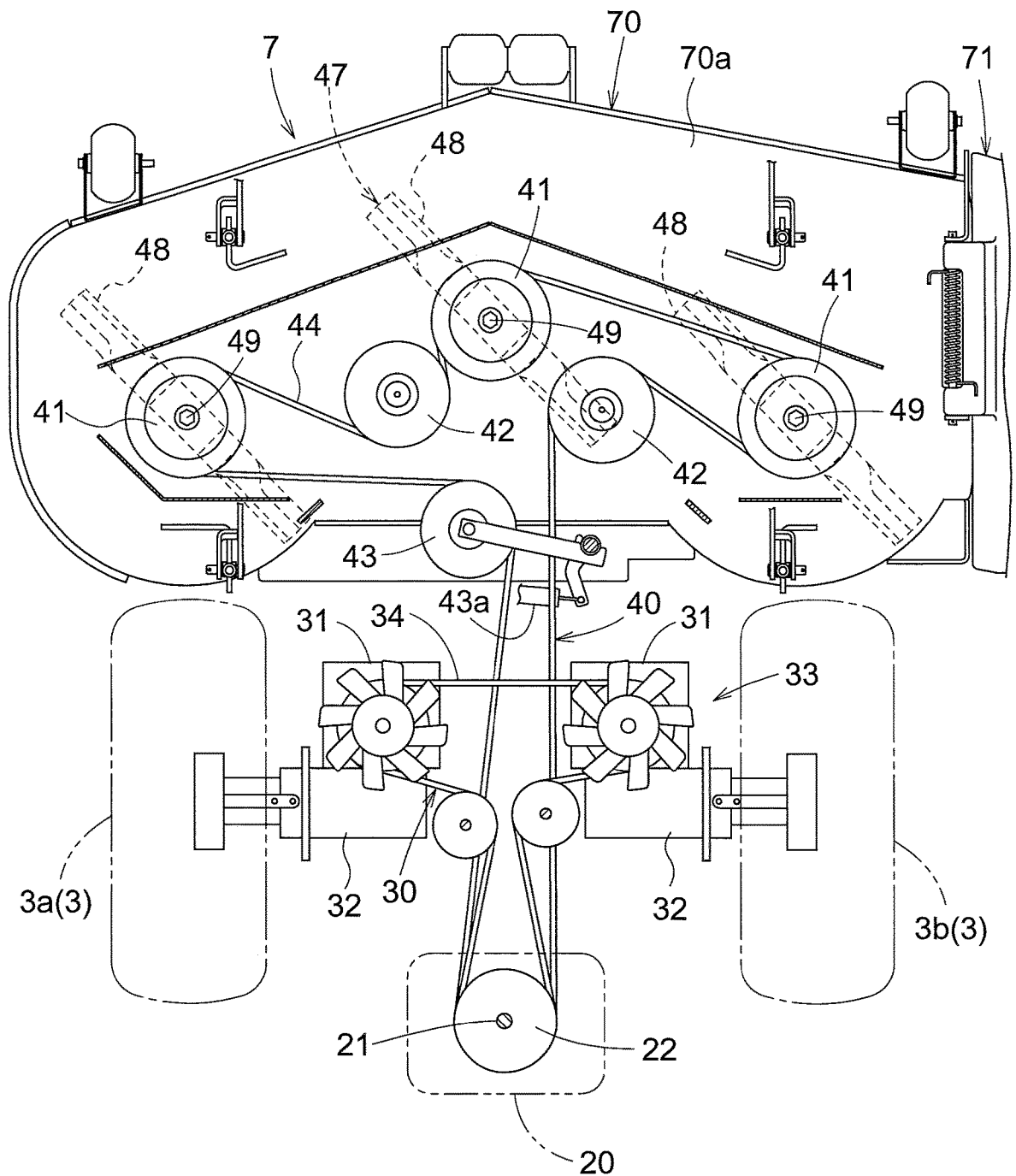
FIG. 2 is a plan view of a mower deck.

The mower, as shown in FIG. 1 and FIG. 2, includes a vehicle body frame 1 supported on the ground surface by a front wheel unit 2 as a caster unit and a rear wheel unit 3 as driven wheels. This mower is configured as a so-called "zero-turn mower", with a left rear wheel 3a and a right rear wheel 3b (see FIG. 2) together constituting the rear wheel unit 3 being adjustable in their forward and reverse speeds independently of each other. The front wheel unit 2 includes a pair of front wheels 2a, 2b as caster (free-rotating) wheels. The vehicle body frame 1 is constituted by interconnection of a longitudinal frame extending in the vehicle body front/rear direction and cross bars extending in the vehicle body transverse direction. The pair of left and right front wheels 2a, 2b are connected to the front end portion of the vehicle body frame 1 and attached to respective ends of a front wheel support frame 2A that extends in the vehicle body transverse direction. This front wheel support frame 2A can be a constituent element of the vehicle body frame 1. Between the front wheel unit 2 and the rear wheel unit 3, a mower deck 70 of a mower unit 7 is suspended from the vehicle body frame 1 to be freely lifted up/down relative thereto.

The mower deck 70 is configured as a side discharge type and a discharge cover 71 is provided on a grass discharging side of this mower deck 70.

The vehicle body frame 1 extends in the front/rear direction and at a center portion of this vehicle body frame 1, a driver's seat 12 is provided. On an upper face of a front portion of the vehicle body frame 1, a floor plate 18 is disposed to be used as a "footrest" for the driver. In FIG. 1, the rear portion of the vehicle body frame 1 is covered (concealed) by a hood 11, but here an engine 20 (see FIG. 2) as an internal combustion engine and engine accessory devices are provided. The engine 20 is mounted under a posture with its engine output shaft 21 (see FIG. 2) protruding downwards. On a lateral side of the engine 20, a fuel tank 16 is mounted.

On the left and right opposed sides of the driver's seat 12, fenders 15 are provided. In the upper faces of these fenders 15, user operational devices such as various kinds of operational levers, operational buttons, etc. are disposed. On the rear side of the driver's seat 12, an arch-shaped ROPS 17 is mounted vertically.

A maneuvering unit 13 as one of the above-described user operational devices consists of a left maneuvering lever 13a disposed on the left side of the driver's seat 12 and a right maneuvering lever 13b disposed on the right side of the driver's seat 12. The left maneuvering lever 13a is used for adjusting a rotational speed of the left rear wheel 3a. The right maneuvering lever 13b is used for adjusting a rotational speed of the left rear wheel 3b. These left and right maneuvering levers 13a and 13b are pivotally displaceable among a forward speed changing range, a neutral and a reverse speed changing range.

FIG. 2 shows schematically a power transmission system of this mower. This power transmission system includes a traveling transmission mechanism 30 for transmitting engine power to the rear wheel unit 3 and an implement transmission mechanism 40 for transmitting engine power to the mower unit 7. The power from the engine 20 is outputted via upper and lower two stages of an output pulley 22 attached to the engine output shaft 21.

The traveling transmission mechanism 30 includes a pair of left and right HST's (hydrostatic transmission) 31, a pair of left and right gear transmission mechanisms 32 and a traveling belt transmission mechanism 33. The traveling belt transmission mechanism 33 is configured to transmit powers outputted via the upper and lower stages of the output pulley 22 attached to the engine output shaft 21 to the respective HST's 31 via a traveling belt 34. The gear transmission mechanisms 32 transmit powers speed-changed through the HST's 31 to the left rear wheel 3a and the right rear wheel 3b respectively.

The speed changing operations by the left and right HST's 31 are effected by control signals generated based on pivotal operations on the left maneuvering lever 13a and the right maneuvering lever 13b, respectively. In response to user operations on the left maneuvering lever 13a and the right maneuvering lever 13b, there are realized a stopped state, a straight traveling state, a gentle turning state, a pivot turning state and a spin turning state, respectively. The straight traveling state is realized by driving the left rear wheel 3a and the right rear wheel 3b together at an equal speed forwardly or reversely. The gentle turning state is realized by driving the left rear wheel 3a and the right rear wheel 3b at different speeds from each other forwardly or reversely. The pivot turning state is realized by stopping one of the left rear wheel 3a and the right rear wheel 3b and driving the other forwardly or reversely. The spin turning state is realized by driving one of the left rear wheel 3a and the right rear wheel 3b forwardly and driving the other reversely.

In an inner space of the mower deck 70, a blade unit 47 is disposed. In this embodiment, the blade unit 47 is configured as a three-blade horizontal rotation type. Therefore, this blade unit 47, as shown by dotted lines in FIG. 2, includes three blades 48 disposed side by side in the vehicle body transverse direction. And, the three blades 48 are arranged to cooperate in such a manner as to obtain a cutting width (denoted with a sign: W in FIG. 3) which is formed continuous without any interruption in the vehicle body transverse direction.

Each blade 48 is fixed to a corresponding rotational shaft 49 rotatably supported to a top plate 70a of the mower deck 70 The implement transmission mechanism 40 for transmitting powers from the output pulley 22 of the engine 20 to the respective rotational shafts 49 is configured as an implement belt transmission mechanism. This implement transmission mechanism 40 includes input pulleys 41 fixed to the rotational shafts 49 of the respective blades 48, a direction changing pulley 42, a tension clutch pulley 43 as an implement clutch, and a length of implement belt 44 wound around these pulleys. Each blade 48 is rotated at a rotational speed proportional to an engine rotational speed. The tension clutch pulley 43 is switched into an engaged state or a disengaged state by a clutch solenoid 43*a*.

Figure 3:
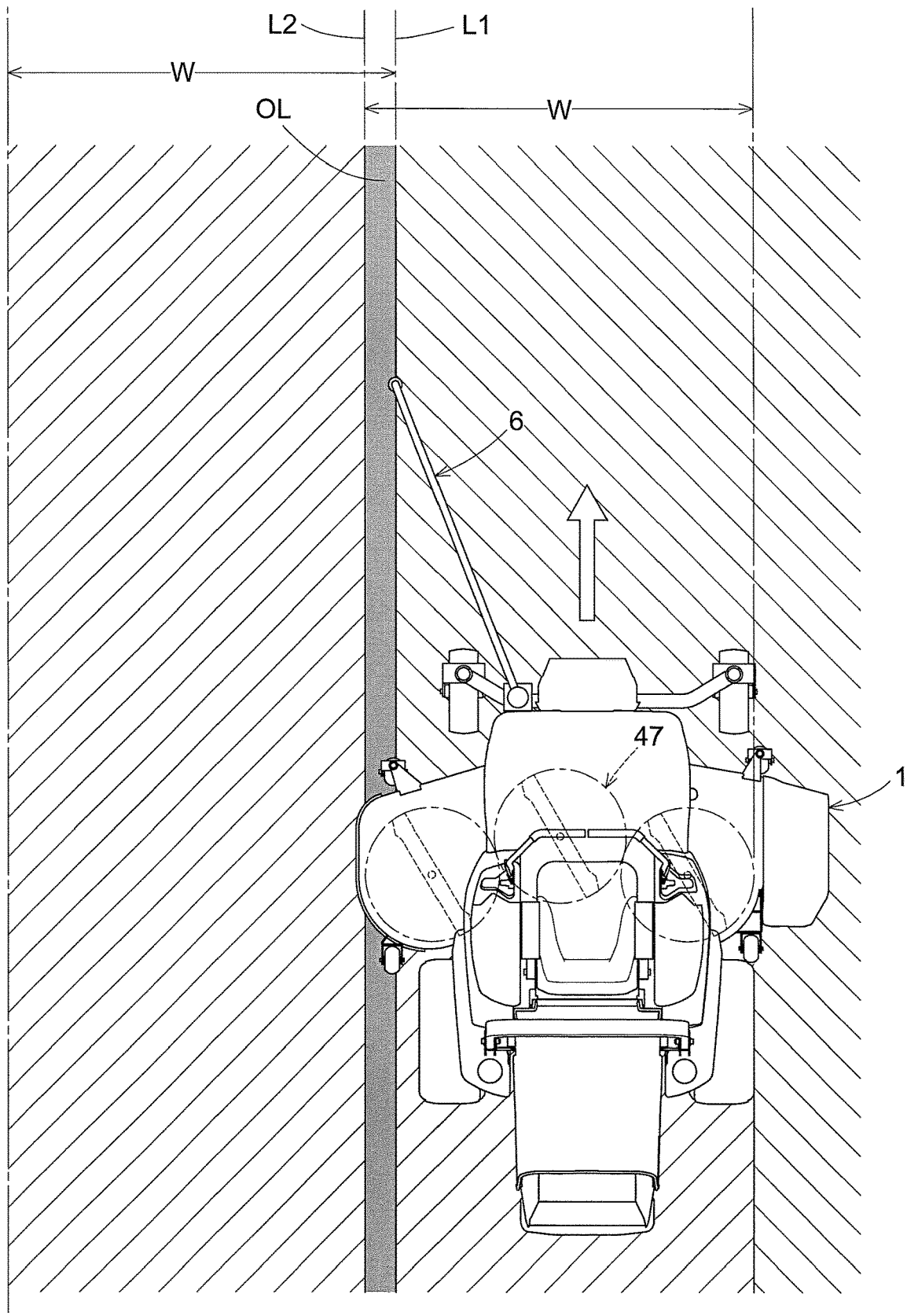
FIG. 3 is a schematic for illustrating a cutting width and a cutting overlap line.

As shown in FIG. 3, in association with traveling of the mower, the blade unit 47 cuts grass by the cutting width: W. In this, on the left and right sides respectively of the blade unit 47, overlaps (denoted with a sign: OL in FIG. 3) are set. With this arrangement, no grass cutting leftover occurs as long as a traveling deviation in the horizontal direction of the mower is confined within the overlap: OL. To this end, the driver needs to maneuver to travel along a traveling target line taking the overlaps into consideration. Such traveling target line will be referred to herein as "cutting overlap line". Preferably, this cutting overlap line, as shown in FIG. 3, is either a trace of one side edge of the blade unit 47 formed in a previous grass-cutting travel (a border line between an uncut area and a cut area and denoted with a sign: L1 in FIG. 3) or a trace of the edge of the previously cut area side of the blade unit 47 in a present grass-cutting travel (denoted with a sign: L2 in FIG. 3). In FIG. 3, as such cutting overlap line, the border line: L1 between the uncut area and the cut area is employed. Incidentally, the distance between L1 and L2 is the overlap: OL.

In the present invention, a cutting guide device 6 is mounted for creating an overlap mark for indicating the cutting overlap line: L1 or L2 at a position forwardly of the front wheel unit 2 and closer to the ground surface than the vehicle body frame 1.

In the instant embodiment, the cutting guide device 6 is configured as a mechanical type and comprised of a mechanical guide assembly 6A. As shown in FIG. 1 and FIG. 2, the mechanical guide assembly 6A consists essentially of a mount 60, a base rod 61 and a marker body 62. The base rod 61 includes a horizontal rod portion 611 and a vertical rod portion 612. The mount 60 consists of a body 601 fixed to a front end portion of the vehicle body frame 1 or to the front wheel support frame 2A and a movable portion 602 position-adjustable relative to the body 601. The horizontal rod portion 611 is fixed to the movable portion 602. The horizontal rod portion 611 extends substantially horizontally in front of the front wheel unit 2. The vertical rod portion 612 extends downwards from the horizontal rod portion 611, and the horizontal rod portion 611 and the vertical rod portion 612 are connected to each other or formed integral together.

The marker body 62, in order to function as an "overlap mark", is attached to the leading end (lower end) of the vertical rod portion 612 to be located at a position several centimeters above the grass surface. The marker body 62 has such a size and a shape that allow visual recognition or viewing thereof by a driver seated at the driver's seat 12 and preferably has a spherical shape or a conical shape. This marker body 62 can be formed integral with the vertical rod portion 612. For improvement of the visibility by the driver, the marker body 62 can be formed as a light emitting body. Such light emitting body can be created by applying fluorescent paint thereon or embedding LED therein. The position of the movable portion 602 will be adjusted so as to be brought to an upper portion of or upwardly of the cut grass or uncut grass to indicate the cutting overlap line: L1 or L2. In FIG. 1, the marker body 62 is located upwardly of the border line between an uncut area and a cut area as one of such cutting overlap lines. In the instant embodiment, the body 601 and the movable body 602 of the mount 60 together function as a "position changing unit" for varying the in-air position of the marker body 602 as the overlap mark.

Figure 4:
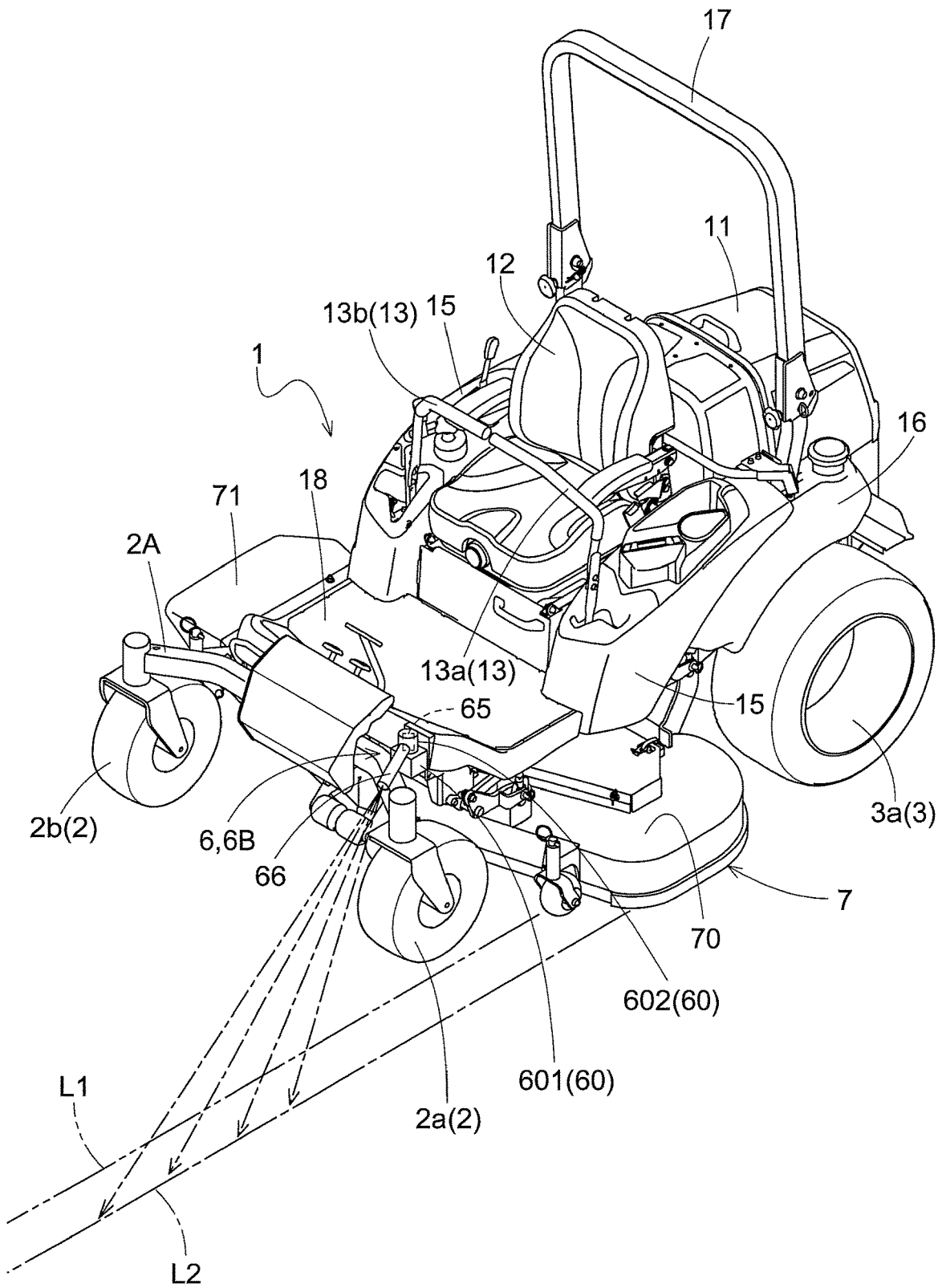
FIG. 4 is a perspective view of a mower relating to a further embodiment using an optical guide assembly as the cutting guide device.

FIG. 4 shows a further embodiment of the cutting guide device 6. This cutting guide device 6 is an optical type and comprised of an optical guide assembly 6B. The optical guide assembly 6B consists essentially of a mount 60 having position adjusting function similarly to the first embodiment, a laser generator 65 and a deflector 66. The laser generator 65 and the deflector 66 are included in the movable portion 602. The deflector 66 deflects a laser beam emitted from the laser generator 65 in such a way to create an overlap mark (illuminated face) on the upper surface of uncut grass or cut grass present forwardly of the front wheel unit 2. Further, the movable portion 602 or the deflector 66 will be adjusted such that the overlap mark created as a laser illuminated face may be located upwardly of the cutting overlap line: L1 or L2. In FIG. 4 illustration, the overlap mark is located upwardly of the trace of the cut rea side edge of the blade unit 47 as one of the cutting overlap lines. The overlap mark (laser illuminated face) can be a dot-like illuminated face. However, for better visibility by the driver, it should preferably be a line-like illuminated face along the cutting overlap line. Such line-like illuminated face can be created by providing the deflector 66 with a laser scanning function. Alternatively, such line-like illuminated face can be created also by a lens system with a diffraction grating. Advantageously, the laser generator 65 should allow selection of brightness and/or color of the laser beam to better suit the driver's visibility.

Figure 5:
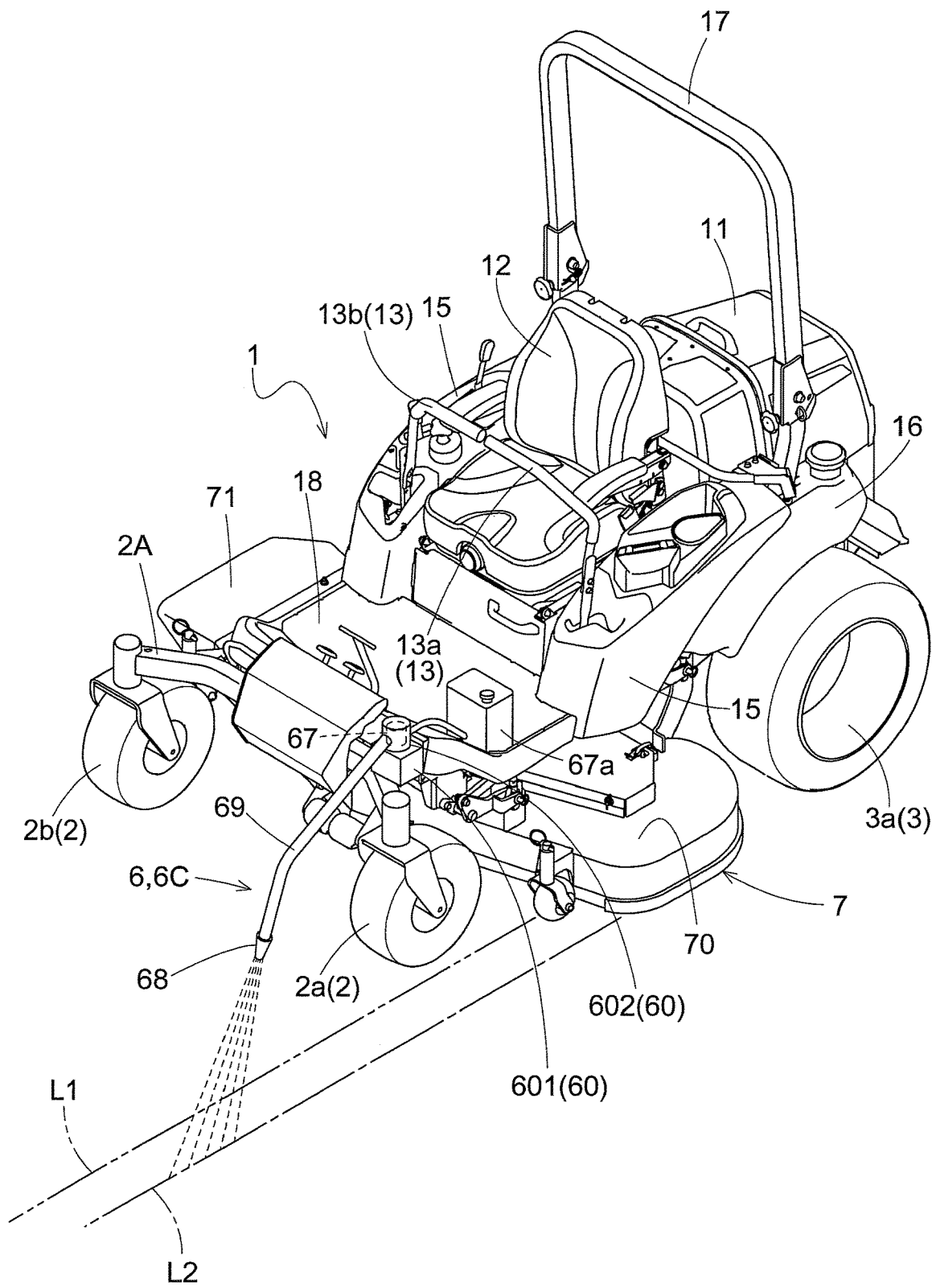
FIG. 5 is a perspective view of a mower relating to a further embodiment using a fluid spray guide assembly as the cutting guide device.

FIG. 5 shows a still further embodiment of the cutting guide device 6. This cutting guide device 6 is a fluid spray type and comprised of a fluid spray guide assembly 6C. This fluid spray guide assembly 6C consists essentially of a mount 60, a fluid pump 67, a nozzle 68 and a pipe member 69. The fluid pump 67 can be included in the movable portion 602 of the mount 60 or in any other portion of the vehicle body frame 1. At an inlet of the fluid pump 67, a fluid tank 67*a* is connected. At an outlet of the fluid pump 67, the pipe member 69 extending forwardly is connected. The nozzle 68 is attached to the leading end (lower end) of the pipe member 69. The pipe member 69 can be a hose or a pipe. In the instant embodiment, an amount of fluid jetting via the nozzle 68 from the fluid pump 67 through the pipe member 69 will form an overlap mark to be poured down onto the uncut area or an upper portion of the cut area. The nozzle 68 may be provided with a discharge opening arranged to create a line-like jet flow. Further, the fluid to be used is preferably water or colored water. However, if it does not give any damage to the grass, any other fluid or even powder can be employed also. In FIG. 5 too, the overlap mark is located upwardly of the trace: L2 of the cut area side edge of the blade unit 47 as one of the cutting overlap lines.

In the meantime, the arrangements disclosed in the foregoing embodiment (including the further embodiments) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

The invention claimed is:

1. A mower comprising:
   a vehicle body frame;
   front wheels and rear wheels that support the vehicle body frame on a ground surface;
   a driver's seat disposed upwardly of the vehicle body frame;
   a mower deck disposed downwardly of the vehicle body frame;
   a blade disposed inside the mower deck; and
   a cutting guide configured to create an overlap mark that visually indicates a cutting overlap line to an operator at a position forwardly of the front wheels and the mower deck and closer to the ground surface than the vehicle body frame, wherein
   the cutting guide is operative with a leading end of the cutting guide positioned above uncut grass; and
   wherein: the cutting guide is configured as a mechanical guide assembly; and the mechanical guide assembly includes a base rod attached to the vehicle body frame, and a marker body as an overlap mark provided at a leading edge of the base rod, the marker body being located at an upper portion of the uncut grass or upwardly thereof.

2. The mower of claim 1, further comprising:
   a position changer that changes an in-air positon of the overlap mark.

3. The mower of claim 1, wherein the marker body is a light emitting body.

4. A mower comprising:
   a vehicle body frame;
   front wheels and rear wheels that support the vehicle body frame on a ground surface;
   a driver's seat disposed upwardly of the vehicle body frame;
   a mower deck disposed downwardly of the vehicle body frame;
   a blade disposed inside the mower deck; and
   a cutting guide configured to create an overlap mark that visually indicates a cutting overlap line to an operator at a position forwardly of the front wheels and the mower deck and closer to the ground surface than the vehicle body frame,
   wherein:
   the cutting guide is configured as an optical guide assembly; and
   the optical guide assembly incudes a laser generator and a deflector, the deflector deflects a laser beam emitted from the laser generator in such a manner as to create the overlap mark at an upper portion of uncut grass or cut grass or upwardly thereof.

5. The mower of claim 4, wherein the laser generator allows selection of brightness and/or color of the laser beam.

6. A mower comprising:
   a vehicle body frame;
   front wheels and rear wheels that support the vehicle body frame on a ground surface;
   a driver's seat disposed upwardly of the vehicle body frame;
   a mower deck disposed downwardly of the vehicle body frame;
   a blade disposed inside the mower deck; and
   a cutting guide configured to create an overlap mark that visually indicates a cutting overlap line to an operator at a position forwardly of the front wheels and the mower deck and closer to the ground surface than the vehicle body frame,
   wherein:
   the cutting guide is configured as a fluid spray guide assembly; and
   the fluid spray guide assembly includes a fluid pump and a nozzle, the nozzle deflecting fluid fed from the fluid pump in such a manner as to create the overlap mark at an upper portion of uncut grass or cut grass or upwardly thereof.

7. The mower of claim 6, wherein the fluid is water or colored water.

* * * * *